(12) United States Patent
Shimozawa

(10) Patent No.: US 6,302,442 B1
(45) Date of Patent: Oct. 16, 2001

(54) ATTACHMENT STRUCTURE OF A SEAT BELT SYSTEM

(75) Inventor: Tomomi Shimozawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,881

(22) Filed: Jun. 15, 1999

(30) Foreign Application Priority Data

Jun. 16, 1998 (JP) .................................................. 10-168778

(51) Int. Cl.[7] .................................................. B60R 22/34
(52) U.S. Cl. ........................... 280/807; 280/808; 296/210
(58) Field of Search ............................... 280/801.1, 808, 280/807; 296/210; 297/468

(56) References Cited

U.S. PATENT DOCUMENTS

| | | | |
|---|---|---|---|
| 3,542,425 | * | 11/1970 | Pringle ................................ 280/801.1 |
| 3,963,273 | * | 6/1976 | Nagazumi .......................... 280/801.1 |
| 4,568,107 | * | 2/1986 | Biviano ................................. 280/808 |
| 4,645,234 | * | 2/1987 | Koide ................................... 280/808 |
| 4,775,181 | * | 10/1988 | Shoda ................................... 296/210 |
| 4,784,407 | * | 11/1988 | Verellen et al. ..................... 280/804 |
| 4,915,413 | * | 4/1990 | Meyer ................................ 280/801.1 |
| 5,106,121 | * | 4/1992 | Boone .................................. 280/807 |
| 5,253,896 | * | 10/1993 | Verbeski ........................... 280/801.1 |
| 5,590,907 | * | 1/1997 | McQueen, II et al. ........... 280/801.1 |
| 5,795,014 | * | 8/1998 | Balgaard ............................. 296/210 |
| 6,065,776 | * | 5/2000 | Toyota et al. ..................... 280/801.1 |

FOREIGN PATENT DOCUMENTS 63-130448    2/1988    (JP) .

* cited by examiner

*Primary Examiner*—Richard Chilcot
*Assistant Examiner*—Lynda Jasmin
(74) *Attorney, Agent, or Firm*—Smith, Gambrell & Russell, LLP

(57) ABSTRACT

There is provided an attachment structure of a seat belt system for a rear seat in which a seat belt retractor can be attached without causing an increase in vehicle weight and an increase in manufacturing cost, and the use feeling of the seat belt system is not lowered. The seat belt retractor is fixed to a bracket in the vicinity of a coupling portion. The coupling portion is defined by a D-pillar at one side of the rear of a body shell, a side rail, and a rear rail.

8 Claims, 4 Drawing Sheets

ATTACHMENT STRUCTURE OF A SEAT BELT SYSTEM

BACKGROUND OF THE INVENTION

1. Field of the Invention

The present invention relates to an attachment structure of a seat belt system for a rear seat, and particularly to an attachment structure of a three-point seat belt system for a center seat of a three occupant rear seat in a vehicle such as a station wagon.

2. Description of the Related Art

In recent years, in a vehicle, for the purpose of improving the safety of a passenger, there is a tendency to adopt a three-point seat belt system for a rear seat as well.

In a station wagon in which a rear seat is made of a three occupant seat, at both the right and left seat portions of the rear seat, the structure of a seat belt system can be easily made a three-point type by fixing a seat belt retractor to a C-pillar. However, at the center seat portion of the rear seat, a two-point seat belt system has been generally adopted, because it is difficult to secure a fixing place for a seat belt retractor.

In a rear seat of such a station wagon, for the purpose of providing a three-point seat belt system at the center seat as well, for example, as disclosed in Japanese Patent Unexamined Publication No. Sho. 63-130448, it is conceivable that a seat belt retractor for the center seat portion is provided at the lower surface of the roof center portion in the vehicle compartment.

However, in order to provide the seat belt retractor at the lower surface of the roof center portion in the vehicle compartment as set forth above, it is necessary to reinforce the roof, which causes an increase in vehicle weight and an increase in manufacturing cost.

In addition, there has been hitherto proposed a technique for making a seat belt system for the center seat portion a three-point type by reinforcing the back of the rear seat and its peripheral member, and by fixing a seat belt retractor to the inside of the thus reinforced back of the rear seat. However, reinforcing the back of the rear seat and its peripheral member causes an increase in vehicle weight and an increase in manufacturing cost similarly to the foregoing technique.

On the other hand, when a seat belt retractor is fixed to a floor of a luggage room behind the rear seat to make a seat belt system of the center of the rear seat a three-point type, it not only becomes difficult to draw out a belt when using the seat belt, but also there is a fear that the usefulness of the luggage room will be deteriorated while the seat belt system is used.

SUMMARY OF THE INVENTION

The present invention has been made in view of the above. It is an object of the invention to provide an attachment structure of a seat belt system for a rear seat in which a seat belt retractor can be attached without increasing a vehicle weight and a manufacturing cost and also lowering the use feeling of the seat belt system.

The above-mentioned object can be achieved by an attachment structure of a seat belt system for a rear seat of a vehicle, the attachment structure comprising:

a longitudinal member provided at a side of a roof and extending in a rear-and-front direction;

a lateral member provided at the roof and extending in a width direction of the vehicle, the lateral member being coupled to the longitudinal member at a coupled portion; and a pillar member for supporting the roof in the vicinity of the coupling portion;

wherein a seat belt retractor for the rear seat is provided in the vicinity of the coupling portion.

In the above-mentioned attachment structure, it is preferable that it further comprises:

a bracket provided in the vicinity of the coupling portion and extended between the longitudinal member and the lateral member, in which the seat belt retractor is fixed to the bracket.

In addition, in the above-mentioned attachment structure, it is advantageous that the longitudinal member and the lateral member are constructed to have a predetermined thickness under the roof, the bracket is provided under the longitudinal member and the lateral member, and the seat belt retractor is fixed at an upper surface of the bracket.

Further, in the above-mentioned attachment structure, it is advantageous that the longitudinal member is a side rail of the roof.

Furthermore, in the above-mentioned attachment structure, it is advantageous that the lateral member is a rear rail of the roof.

Moreover, in the above-mentioned attachment structure, it is advantageous that the lateral member is a rear rail of the roof, the vehicle is a station wagon, the rear rail includes a reinforcing member for attachment of a hinge for supporting a rear hatch to be freely opened and closed, and one end of the bracket is coupled to the reinforcing member for attachment of the hinge.

Still furthermore, in the above-mentioned attachment structure, it is advantageous that the lateral member is a rear rail of the roof, the vehicle includes a roof rail on an upper portion of the roof, the rear rail includes a reinforcing member for attachment of the roof rail, and the other end of the bracket is coupled to the side rail in the vicinity of the reinforcing member for attachment of the roof rail.

DETAILED DESCRIPTION OF THE PREFERRED EMBODIMENTS

Figure 1:
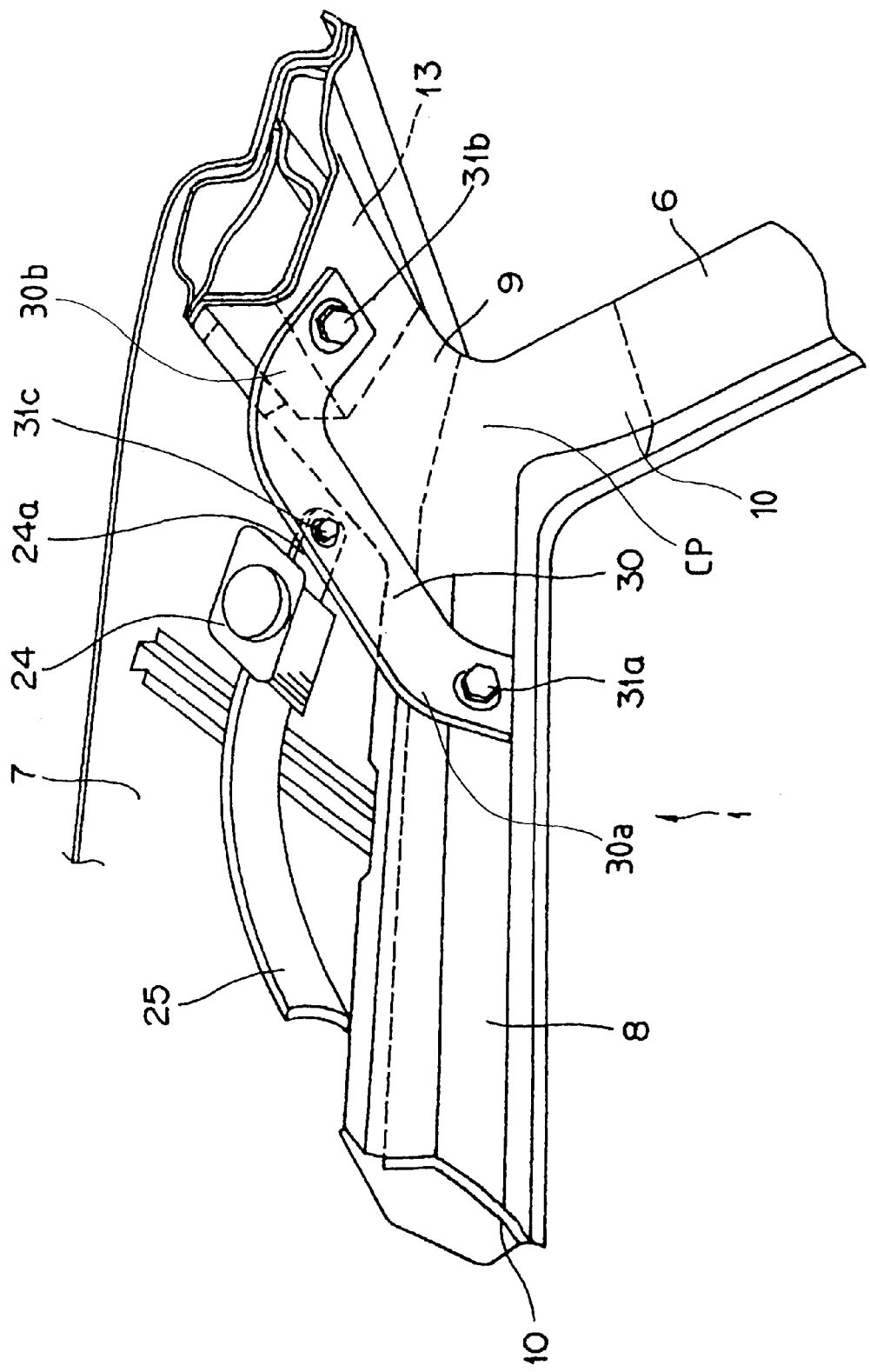
FIG. 1 is a perspective view showing a main inside portion of a body shell of a station wagon seen obliquely from below.
Figure 2:
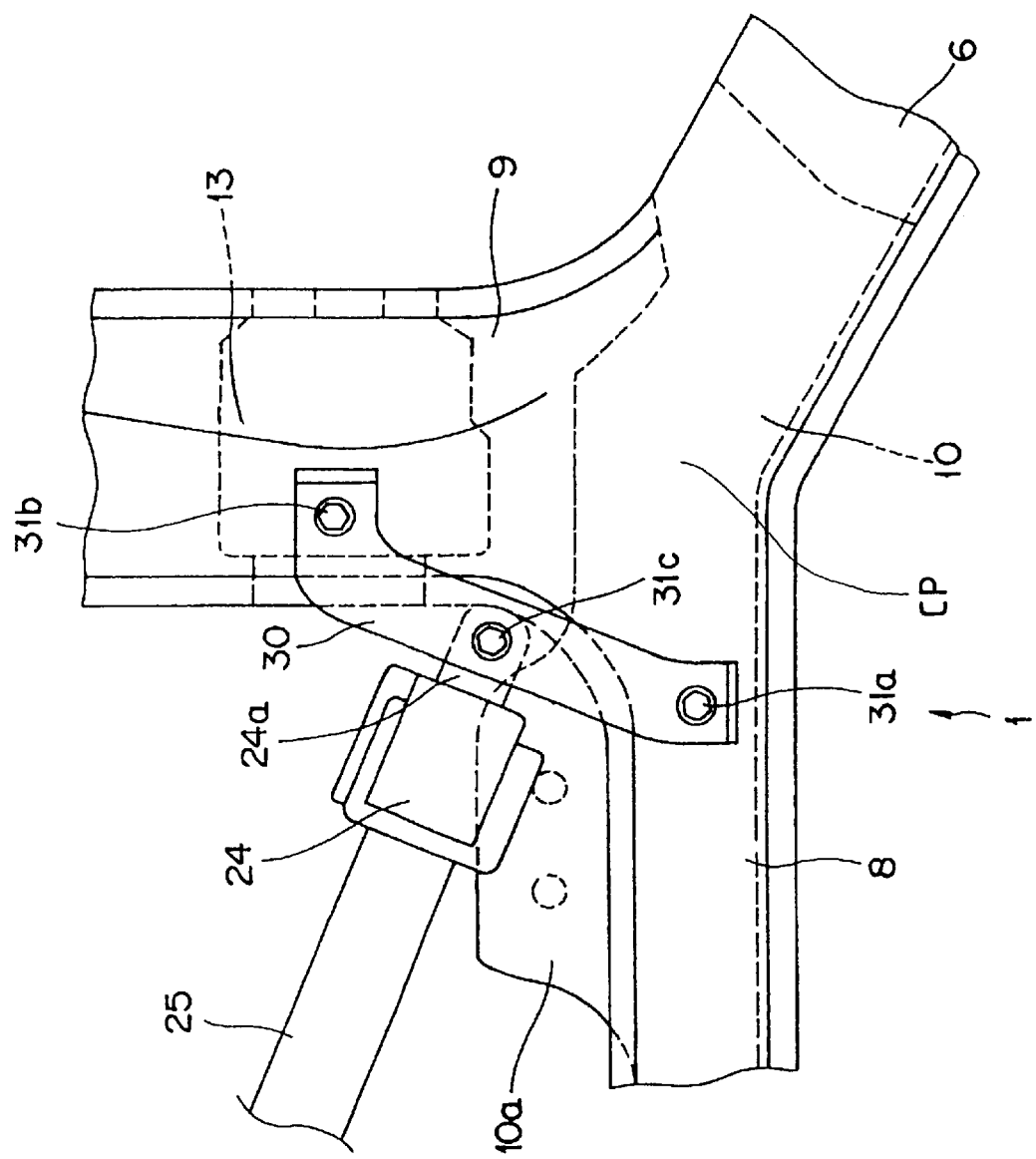
FIG. 2 is a bottom view showing the main portion of the body shell of the station wagon seen from below.
Figure 3:
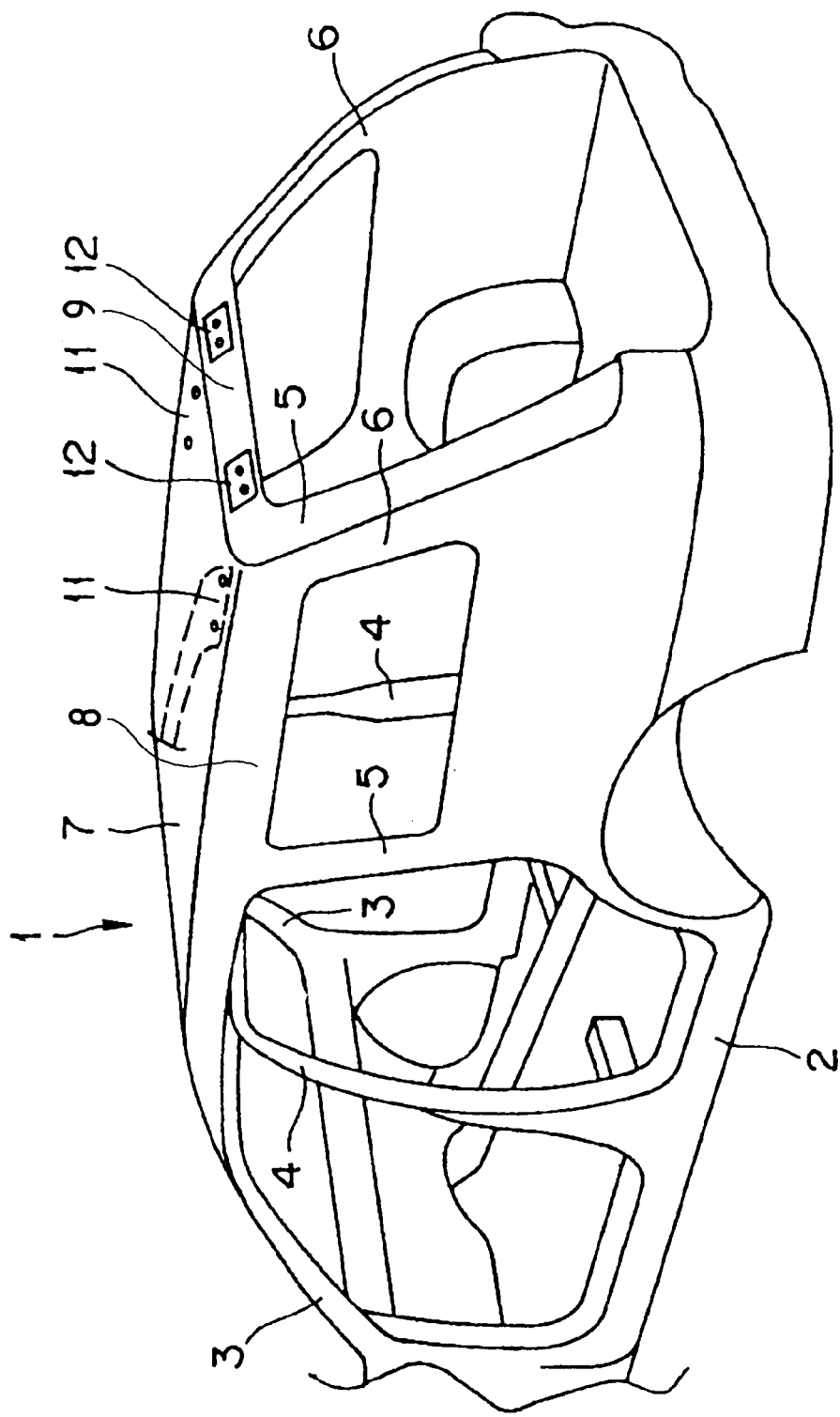
FIG. 3 is a perspective view showing the body shell of the station wagon seen obliquely from behind.
Figure 4:
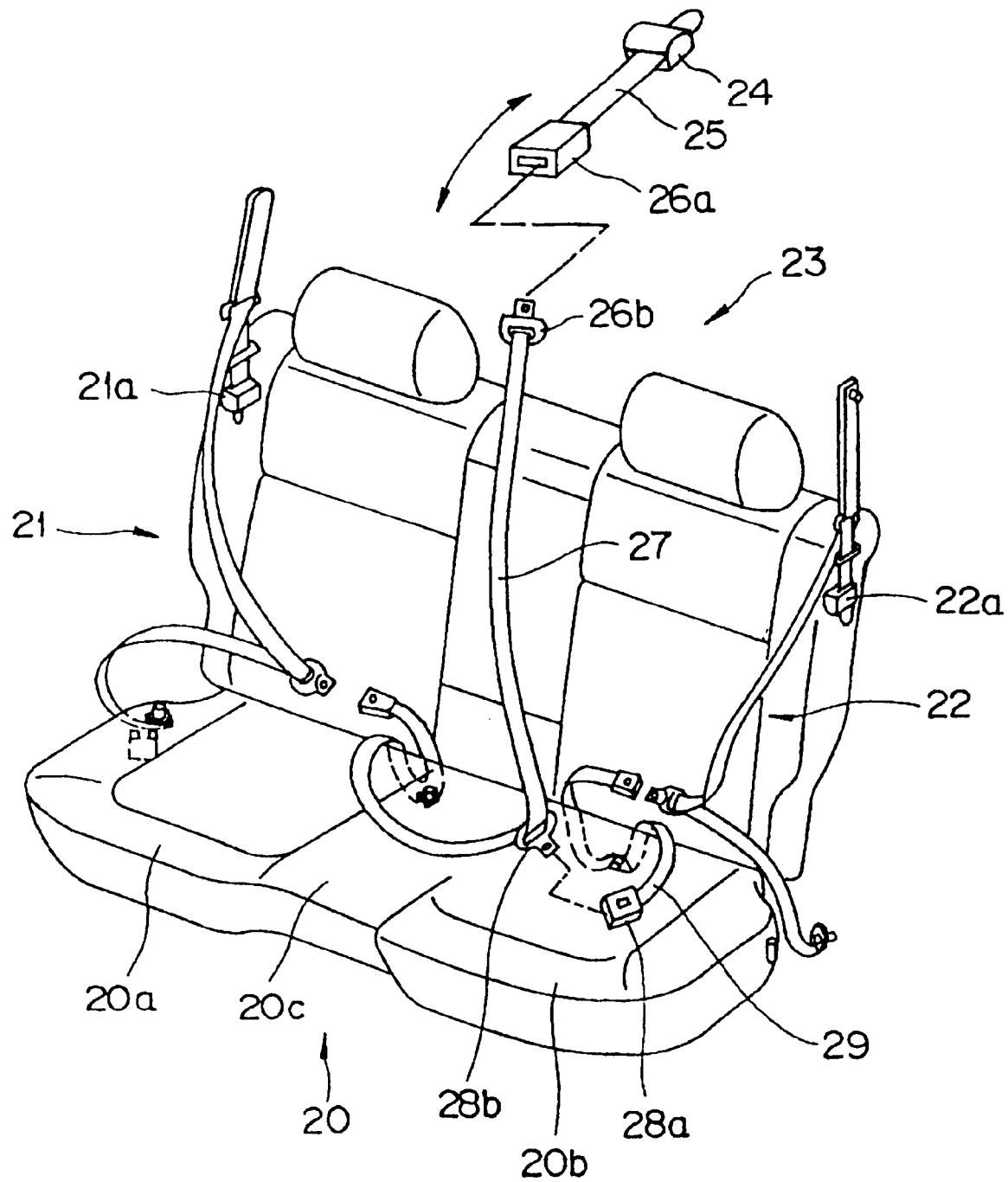
FIG. 4 is an explanatory view showing a seat belt of a rear seat.

Preferred embodiments of the present invention will be described below with reference to the drawings. FIGS. 1 to 4 show an embodiment of the present invention. FIG. 1 is a perspective view showing a main inside portion of a body shell of a station wagon seen obliquely from below, FIG. 2 is a bottom view showing the main inside portion of the body shell of the station wagon seen from below, FIG. 3 is a perspective view showing the body shell of the station wagon seen obliquely from behind, and FIG. 4 is an explanatory view showing a seat belt of a rear seat.

In FIG. 3, reference numeral 1 denotes a body shell of a station wagon. The body shell 1 includes an under body 2, standing pillar members provided at the sides of the under body 2 sequentially from the front side, which are A-pillars 3, B-pillars 4, C-pillars 5, and D-pillars 6, and a roof panel 7 supported by these pillars.

Here, a supporting structure of the roof panel 7 at the rear of the body shell 1 will be described in detail. As shown in FIGS. 1 and 2, a side rail 8 as a longitudinal member is provided at a side end of the roof panel 7, and a rear rail 9 as a lateral member is provided at a rear end of the roof panel 7.

The side rail 8 and the rear rail 9 are formed into hollow members with a predetermined thickness under the roof panel 7, and a base end portion of the side rail 8 and an end of the rear rail 9 are coupled at a coupling portion CP to each other. Further, the D-pillar 6 is coupled to the side rail 8 in the vicinity of the coupling portion CP to the rear rail 9.

The insides of the D-pillar 6 and the side rail 8 are communicated with each other through the coupling portion thereof, and in this coupling portion, a side reinforcement 10 is provided as a reinforcing member for preventing the coupling portion CP from being bent and broken.

One end of the side reinforcement 10 is extended toward the front of the vehicle along the inside of the side rail 8, and on a midway portion of the extended side reinforcement 10, a reinforcing member 10a for reinforcing a leg attachment portion 11 of a not-shown roof rail is provided (see FIG. 2).

That is, the side reinforcement 10 functions as a reinforcing member for preventing the bend of the coupling portion of the D-pillar 6 and the side rail 8, and further, it functions as a reinforcing member of the leg attachment portion 11 of the roof rail.

In the inside of the rear rail 9, there is provided a rear reinforcement 13 for reinforcing a hinge fixing portion 12 (see FIG. 3) for fixing a hinge (not shown) which supports a rear hatch (not shown) to be freely closed and opened.

In FIG. 4, reference numeral 20 denotes a rear seat installed on the station wagon provided with the foregoing body shell 1, and the rear seat 20 is formed into a three occupant seat made of a right seat portion 20a, a left seat portion 20b, and a center seat portion 20c.

Well known three-point structure seat belt systems 21 and 22 including seat belt retractors 21a and 22a fixed to the C pillars 5 and 5 are provided at the right seat portion 20a and the left seat portion 20b.

On the other hand, a seat belt system 23 provided at the center seat portion 20c includes a seat belt retractor 24, a first seat belt 25, a free end of which extends from the seat belt retractor 24, a buckle 26a provided at the free end of the first seat belt 25, a tongue plate 26b to be freely engaged with the buckle 26a, a second seat belt 27 a free end of which is coupled to the tongue plate 26b, a through tongue 28b provided on a midway portion of the second seat belt 27, a buckle 28a to be freely engaged with the through tongue 28b, and a third seat belt 29 a free end of which is coupled to the buckle 28a.

Here, fixed ends of the second seat belt 27 and the third seat belt 29 are fixed to the under body 2 at portions under the center seat portion 20c while they are separated from each other with a predetermined interval.

The seat belt retractor 24 is, as shown in FIGS. 1 and 2, fixed in the vicinity of the coupling portion of the D-pillar 6 at one side of the rear of the body shell 1, the side rail 8, and the rear rail 9, through a bracket 30 provide to extend to the side rail 8 and the rear rail 9.

More specifically, one end 30a of the bracket 30 is fastened and fixed by a bolt 31a at the lower portion of the side rail 8 reinforced by the side reinforcement 10. At this time, the one end 30a of the bracket 30 is fastened by the bolt 31a in the vicinity of the reinforcing member 10a to reinforce the leg attachment portion 11 of the roof rail.

On the other hand, the other end 30b of the bracket 30 is fastened and fixed by a bolt 31b at the lower portion of the rear rail 9. At this time, the other end 30b of the bracket 30 is fastened by the bolt 31b also to the rear reinforcement 13 for reinforcing the hinge fixing portion 12.

Here, as described above, the side rail 8 and the rear rail 9 are formed into a hollow shape with a predetermined thickness under the roof panel 7, and the bracket 30 is fastened and fixed under these, so that a predetermined interval is formed between the bracket 30 and the roof panel 7.

The seat belt retractor 24 is attached to the bracket 30 by using this interval. An attachment member 24a provided at a base end of the seat belt retractor 24 is brought into contact with the upper surface of the bracket 30, and the attachment member 24a and the bracket 30 are fastened by a bolt 31c, so that the seat belt retractor 24 is fixed.

Incidentally, after the seat belt retractor 24 is fixed between the roof panel 7 and the bracket 30, a roof trim (not-shown) is attached from the inside of the vehicle so that the retractor is covered therewith.

This seat belt system 23 can function as a three-point structure seat belt system, because, as shown in FIG. 4, the first seat belt 25 is extended from the seat belt retractor 24 fixed at the rear of the vehicle, the free end of the first seat belt 25 is engaged with the free end of the second seat belt 27 through the buckle 26a and the tongue plate 26b, and the free end of the third seat belt 29 is engaged with the midway portion of the second seat belt 27 through the buckle 28a and the through tongue 28b.

Since the seat belt retractor 24 is fixed to a collecting portion of the strength members defined by the D-pillar 6, the side rail 8, the rear rail 9, and the like, the thus structured seat belt system 23 for the center seat portion 20c can have sufficient attachment strength even if a new reinforcement for attachment of the seat belt retractor 24 is not prepared or provided.

That is, the side rail 8 and the rear rail 9 as the reinforcing members of the vehicle provided at the roof panel 7 can also be used as reinforcing members for attachment of the seat belt retractor 24.

Thus, it is possible to prevent an increase in vehicle weight and an increase in manufacturing cost when the three-point seat belt system is provided at the center seat portion 20c of the rear seat 20.

In addition, by fixing the seat belt retractor 24 through the bracket 30, it is possible to facilitate an assembling property at the time of assembling the seat belt system 23.

Furthermore, by providing the bracket 30 to extend to the side rail 8 and the rear rail 9 having a hollow shape and having a predetermined thickness under the roof panel 7 and by effectively using the dead space surrounded by the side rail 8 and the rear rail 9 to attach the seat belt retractor 24, it is not necessary to provide a new space for housing the seat belt retractor 24 in the vehicle compartment. At this time, since the seat belt retractor 24 is covered with the roof trim, the excellent appearance of the inside of the vehicle compartment is not damaged.

In addition, when the one end 30a of the bracket 30 is fastened and fixed by the bolt 31a under the side rail 8 reinforced by the side reinforcement 10, the attachment strength of the seat belt retractor 24 can be further improved by fastening with the bolt 31a.

Further, by fixing the one end 30a of the bracket 30 in the vicinity of the reinforcing member 10a for reinforcing the leg attachment portion 11 of the roof rail, force applied to the bracket 30 can be dispersed through the roof rail.

Additionally, the attachment strength of the seat belt retractor 24 can be further improved by fastening the other end 30b of the bracket 30 with the bolt 31b at the lower portion of the rear rail 9 reinforced by the rear reinforcement 13 for reinforcing the hinge fixing portion 12.

Because the seat belt retractor 24 is provided at the roof side of the vehicle, it does not lower the use feeling of the seat belt system 23, the luggage room behind the rear seat 20, and the like.

As described above, according to the present invention, it is possible to attach the seat belt retractor without causing an increase in vehicle weight and an increase in manufacturing cost, and it is possible to provide the attachment structure of the seat belt system for the rear seat which does not lower the use feeling of the seat belt system.

The present invention is based on Japanese Patent Application No. Hei. 10-168778, which is incorporated herein by reference.

While this invention has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An attachment structure of a seat belt system for a rear seat of a vehicle, the attachment structure, comprising:
   a longitudinal member provided at a side of a roof panel the longitudinal member provided for reinforcing the vehicle and extending in a rear to front direction of the vehicle;
   a lateral member provided at a rear of the roof panel and coupled to the longitudinal member, the lateral member provided for reinforcing the vehicle and extending in a width direction of the vehicle;
   a pillar member provided for supporting the roof panel, wherein the pillar member is coupled to the longitudinal member;
   a bracket fixed to the longitudinal member and the lateral member; and
   a seat belt retractor mounted to the bracket and supported by the longitudinal member and the lateral member,
   wherein the longitudinal member and the lateral member function as reinforcing members for supporting the seat belt retractor, and wherein the seat belt retractor is fixed at a location proximate where the longitudinal member, the lateral member, and the pillar member meet.

2. The attachment structure according to claim 1, further comprising:
   a side reinforcing member provided inside the longitudinal member for reinforcing at least the longitudinal member; and
   a rear reinforcing member provided inside the lateral member for reinforcing at least the lateral member.

3. The attachment structure according to claim 2, wherein the side reinforcing member has an attachment portion for attaching to a roof rail.

4. The attachment structure according to claim 2, wherein the rear reinforcing member has an attachment portion for attaching to a hinge.

5. The attachment structure according to claim 1, wherein the longitudinal member is a side rail of the vehicle and the lateral member is a rear rail of the vehicle.

6. An attachment structure of a seat belt system for a rear seat of a vehicle, the attachment structure, comprising:
   a longitudinal member provided at a side of a roof panel, the longitudinal member provided for reinforcing the vehicle and extending in a rear to front direction of the vehicle;
   a lateral member provided at a rear of the roof panel and coupled to the longitudinal member, the lateral member provided for reinforcing the vehicle and extending in a width direction of the vehicle;
   a pillar member provided for supporting the roof panel, wherein the pillar member is coupled to the longitudinal member;
   a side reinforcing member provided inside the longitudinal member for reinforcing at least the longitudinal member;
   a rear reinforcing member provided inside the lateral member for reinforcing at least the lateral member;
   a bracket fixed to the side reinforcing member and the rear reinforcing member; and
   a seat belt retractor mounted to the bracket and supported by the longitudinal member and the lateral member,
   wherein the longitudinal member and the lateral member function as reinforcing members for supporting the sear belt retractor, and wherein the sear belt retractor is fixed at a location proximate where the longitudinal member, the lateral member, and the pillar member meet.

7. An attachment structure of a seat belt system for a rear seat of a vehicle, the attachment structure, comprising:
   a longitudinal member provided at a side of a roof panel, the longitudinal member provided for reinforcing the vehicle and extending in a rear to front direction of the vehicle;
   a lateral member provided at a rear of the roof panel and coupled to the longitudinal member, the lateral member provided for reinforcing the vehicle and extending in a width direction of the vehicle;
   a pillar member provided for supporting the roof panel, wherein the pillar member is coupled to the longitudinal member;
   a side reinforcing member provided inside the longitudinal member to reinforce at least the longitudinal member, the side reinforcement member including a leg attachment portion for attaching to a roof rail;
   a rear reinforcing member provided inside the lateral member for reinforce at least the lateral member, the rear reinforcing member including at attachment portion for attaching to a hinge;
   a bracket fixed to the side reinforcing member and the rear reinforcing member; and
   a seat belt retractor mounted to the bracket and supported by the longitudinal member and the lateral member,
   wherein the longitudinal member and the lateral member function as reinforcing members for supporting the seat belt retractor, and wherein the seat belt retractor is fixed at a location proximate where the longitudinal member, the lateral member, and the pillar member meet.

8. The attachment structure according to claim 6, wherein the longitudinal member is a side rail of the vehicle and the lateral member is a rear rail of the vehicle.

* * * * *